United States Patent [19]

Hunter et al.

[11] Patent Number: 5,339,323
[45] Date of Patent: Aug. 16, 1994

[54] LASER SYSTEM FOR CONTROLLING EMITTED PULSE ENERGY

[75] Inventors: John Hunter; Sunil Gupta, both of Camarillo, Calif.

[73] Assignee: Lumonics Corporation, Camarillo, Calif.

[21] Appl. No.: 55,965

[22] Filed: Apr. 30, 1993

[51] Int. Cl.[5] .................................................. H01S 3/10
[52] U.S. Cl. ........................................ 372/25; 372/26; 372/29; 372/30; 372/10
[58] Field of Search .................. 372/25, 26, 29, 30, 372/32, 10, 12

[56] References Cited

U.S. PATENT DOCUMENTS

| | | | |
|---|---|---|---|
| 4,930,901 | 6/1990 | Johnson et al. | 372/26 |
| 5,121,245 | 6/1992 | Johnson | 372/10 |
| 5,197,074 | 3/1993 | Emmons, Jr. et al. | 372/26 |

*Primary Examiner*—Georgia Y. Epps
*Attorney, Agent, or Firm*—Freilich Hornbaker Rosen

[57] ABSTRACT

A laser system (20) controlling laser pulse energy by feedback to the laser Q-switch (34) is disclosed. A feedback signal (40) is used to control the time duration of the high loss state of the Q-switch for automatically adjusting the output pulse energy to substantially equal an energy setpoint (84).

8 Claims, 3 Drawing Sheets

LASER SYSTEM FOR CONTROLLING EMITTED PULSE ENERGY

TECHNICAL FIELD

The present invention relates generally to pulsed lasers and more particularly to systems for controlling laser emitted pulse energy.

BACKGROUND OF THE INVENTION

Numerous U.S. Patents are directed to controlling various laser parameters such as output energy, output pulse length, output pulse repetition rate, output pulse shape, output modes and mode locking. To effect such controls, apparatus is disclosed in these Patents which is directed to a) feedback loops which include the Q-switch (e.g., U.S. Pat. Nos. 3,774,120; 4,197,513; 4,959,838); b) Q-switch control with non-feedback means (e.g., U.S. Pat. Nos. 4,375,684; 4,675,872; 4,930,901); c) controlling laser cavity dimensions (e.g., U.S. Pat. Nos. 4,025,875; 4,964,132); d) the use of control means external to the laser (e.g., U.S. Pat. Nos. 3,747,019; 4,730,105; 4,483,005); e) shaping the Q-switch driving pulse (e.g., U.S. Pat. No. 4,752,931); f) switching or controlling the laser gain (e.g., U.S. Pat. Nos. 3,914,709; 4,319,203; 4,539,685; 4,768,198); and g) cavity dumping (e.g., U.S. Pat. No. 4,477,905). A U.S. patent related to laser application is U.S. Pat. No. 4,899,345 while stabilization of light intensity via feedback around an optical amplifier is addressed in U.S. Pat. No. 4,958,354.

SUMMARY OF THE INVENTION

The present invention is directed to systems for controlling emitted light energy from pulsed lasers.

Systems in accordance with the invention are characterized by the use of feedback applied to a laser Q-switch to vary population inversion in the laser cavity. The feedback stabilizes output pulse energy by controlling the time duration of the Q-switch high loss state.

In a preferred embodiment, a light detector develops a feedback signal in response to the emitted light and a controller places the Q-switch in its high loss state for a time duration dependent on the feedback signal and an energy setpoint.

In another preferred embodiment, the controller generates pulse-width modulated pulses which direct the Q-switch to its high loss state.

The novel features of the invention are set forth with particularity in the appended claims. The invention will be best understood from the following description when read in conjunction with the accompanying drawings.

DESCRIPTION OF PREFERRED EMBODIMENTS

Figure 1:
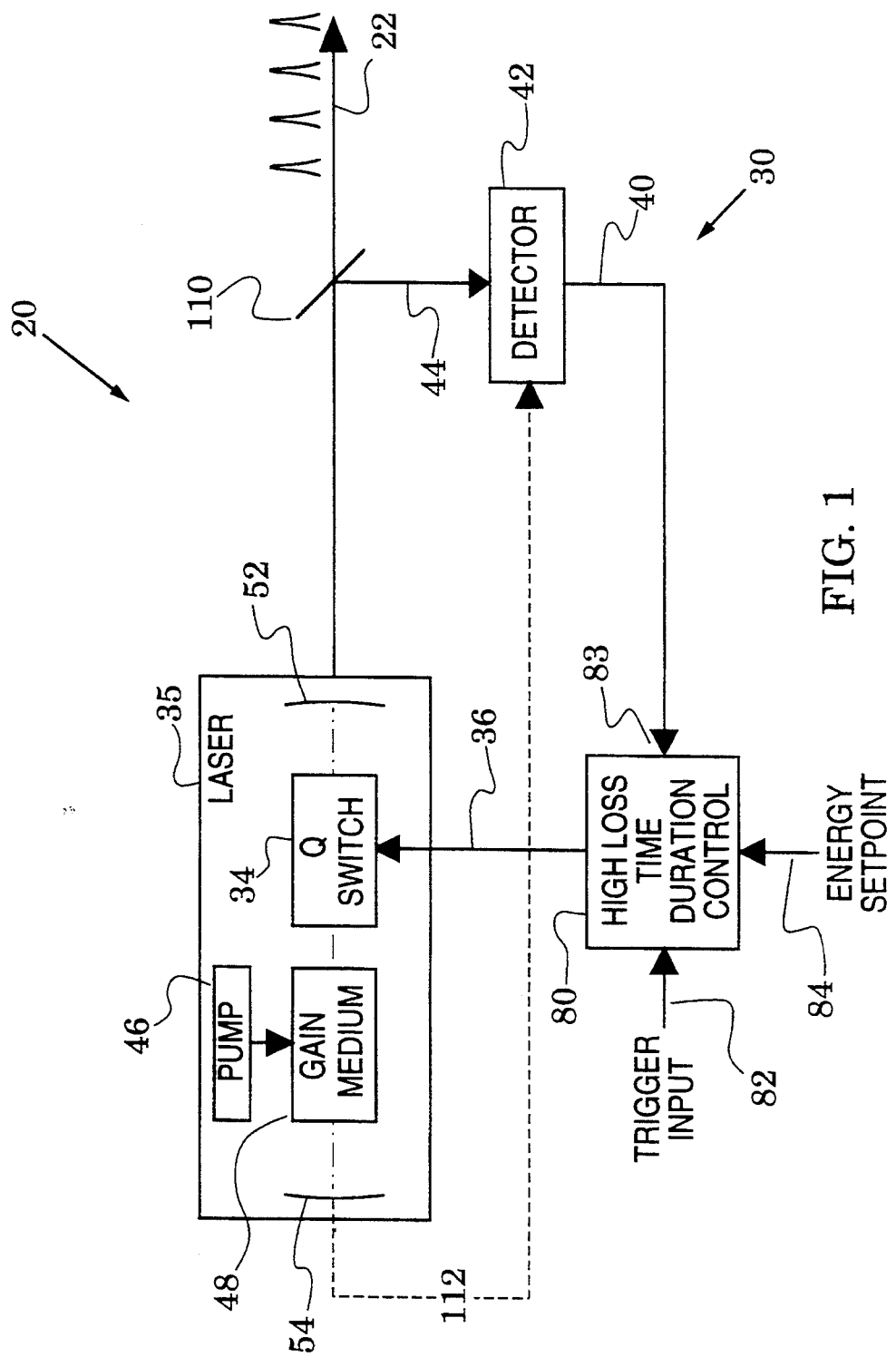
FIG. 1 is a block diagram of a laser system embodiment in accordance with the present invention.

FIG. 1 illustrates a block diagram of a laser system embodiment 20, in accordance with the present invention, which controls the energy of emitted output light pulses 22 with a feedback control loop 30. The system 20 produces the light pulses 22 when the Q-switch 34 of the laser 35 responds to a high loss time duration control signal 36. The time duration control signal 36, in turn, is responsive to an feedback signal 40 formed by a light detector 42 which is sensitive to the energy in a sample 44 of the emitted light pulses 22.

By application of a high loss time duration control signal 36 to the Q-switch 34, the feedback loop 30 controls, for each emitted output pulse, the population inversion in the laser cavity producing that pulse. Thus, by incorporating the Q-switch into a control feedback loop, the system 20 employs population inversion control to stabilize output pulse energy. The system 20 is simple and economical to fabricate because it uses an existing element, the Q-switch, as a control device. It is also efficient because it uses internal energy control means. Energy is not wasted as, for example, in external control systems which control pulse energy by limiting the energy already produced by the laser.

The conceptual details of the system 20 are best described by illustrating the population inversions resulting from control of the Q-switch 34. As is well known in the laser art, pulsed lasers use amplification and feedback to generate output light pulses. The amplification is provided when a pump 46 causes a gain medium 48 to move from a lower to a higher energy level to create a population inversion (upper energy level more populated than the lower energy level). The feedback is provided by a laser cavity terminated by front and rear mirrors 52, 54. Gain and feedback produce laser oscillation in which light is emitted as the gain medium falls back to the lower energy level.

The quality factor Q of the laser cavity is spoiled when the Q-switch 34 changes from a low loss to a high loss state which reduces the feedback below a level required for laser oscillation. The low and high loss states of the Q-switch 34, therefore, respectively cause the light pulse emission 22 from the partially transparent front mirror 54 to be present and absent.

Figure 2A:
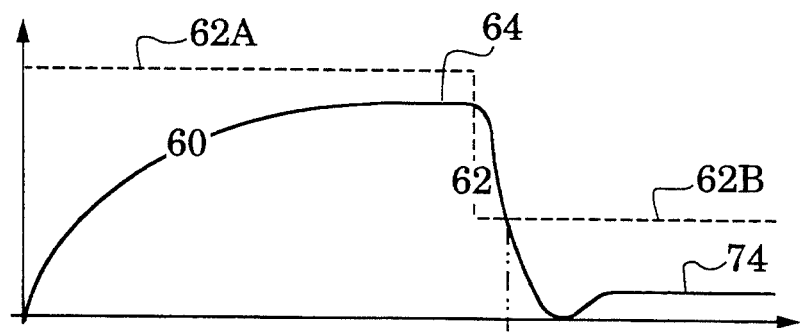
FIG. 2A is a graph of population inversion over time as a function of Q switch states in the system of FIG. 1.
Figure 2B:
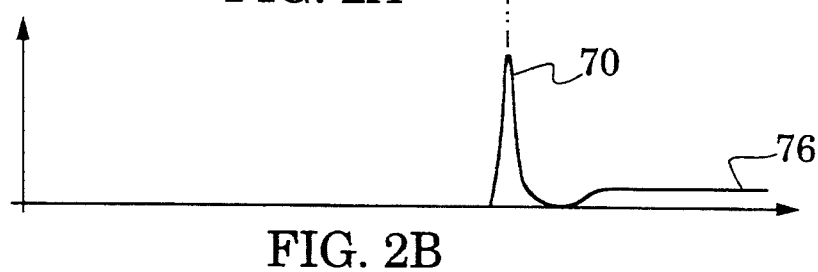
FIG. 2B is h graph of laser emitted pulse power corresponding to the population inversion of FIG. 2A.

FIG. 2A is a graph of typical population inversion over time as a function of Q-switch states which are indicated by the broken line 62. FIG. 2B is a graph of the resulting emitted light power. When the Q-switch is in its high loss state 62A, no light energy is emitted as indicated during this interval in FIG. 2B. Consequently, the population inversion in the laser cavity increases exponentially along the profile 60 until it reaches a saturated level 64. If the Q-switch is changed to its low loss state 62B after the population inversion has reached the level 64, the population inversion 60 rapidly decreases as atoms in the laser cavity revert to their lower energy level causing the large output light pulse 70 shown in FIG. 2B. The phantom line 71 indicates that the pulse occurs as the population inversion falls.

Figure 3A:
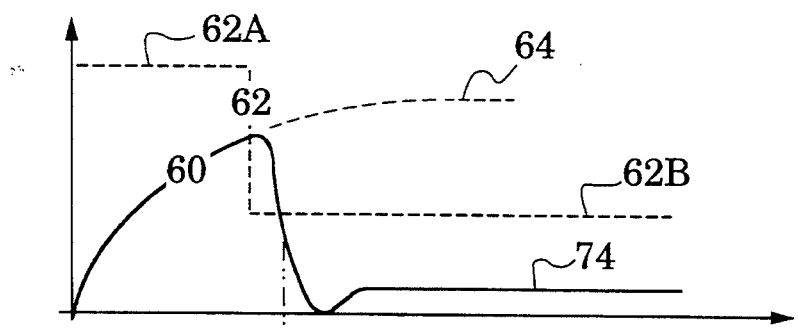
FIG. 3A is another graph of population inversion over time as a function of Q switch states in the system of FIG. 1.
Figure 3B:
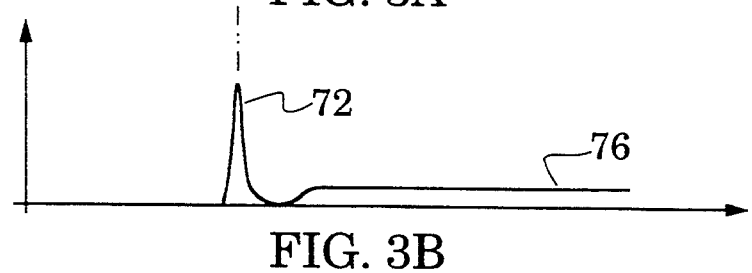
FIG. 3B is a graph of laser emitted pulse power corresponding to the population inversion of FIG. 3A.

FIGS. 3A and 3B are graphs similar to FIGS. 2A and 2B wherein the Q-switch 34 changes to its low loss state 62B when the population inversion profile 60 has reached a point below its saturated level 64. As a result, fewer atoms have been pumped to their higher energy level. Since fewer atoms then revert to their lower energy level, the resultant output pulse 72 has less energy than the pulse 70 of FIG. 2B.

FIGS. 2A, 2B, 3A and 3B thus illustrate, in general, that output pulse energy increases with increased time duration of the Q-switch 34 high loss state (up to the point that the population inversion saturates), i.e., longer duration of the Q-switch in the high loss state results in a higher energy output light pulse when the Q-switch changes to the low loss state. These figures also illustrate that when the Q-switch 34 continues in the low loss state 62B, the population inversion reaches a steady state level 74 which causes a steady state output light emission 76. The peak powers in pulses 70, 72 resulting from increased population inversion are typically several orders of magnitude greater than the steady state emitted light power 76.

Figure 4A:
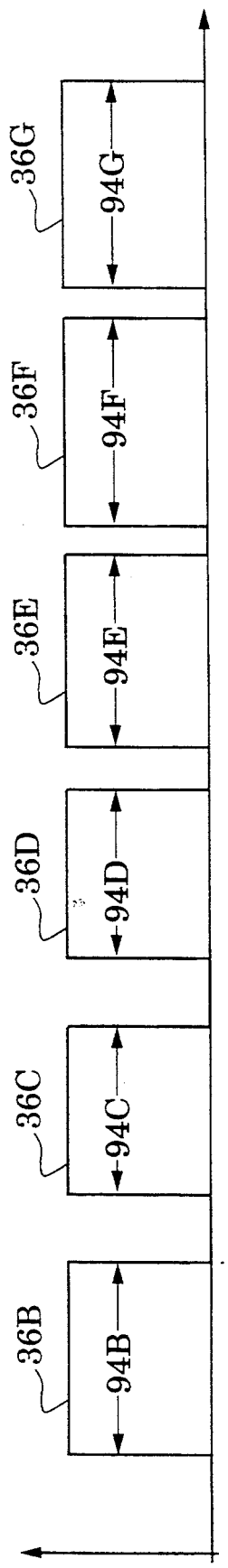
FIG. 4A is a timing diagram showing a pulse-width modulated pulse sequence generated by a feedback loop of the system of FIG. 1 in response to an error signal.
Figure 4B:
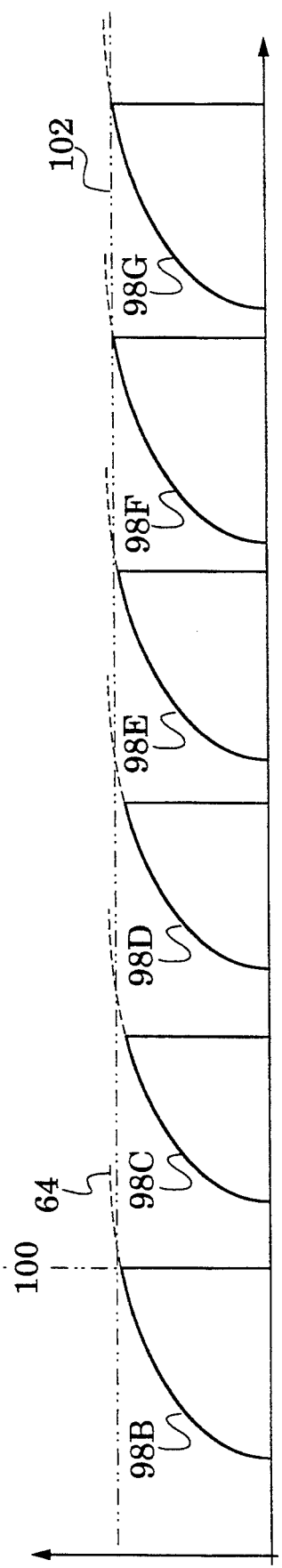
FIG. 4B is a timing diagram showing population inversion profiles in the laser of FIG. 1 in response to the pulse sequence of FIG. 4A.
Figure 4C:
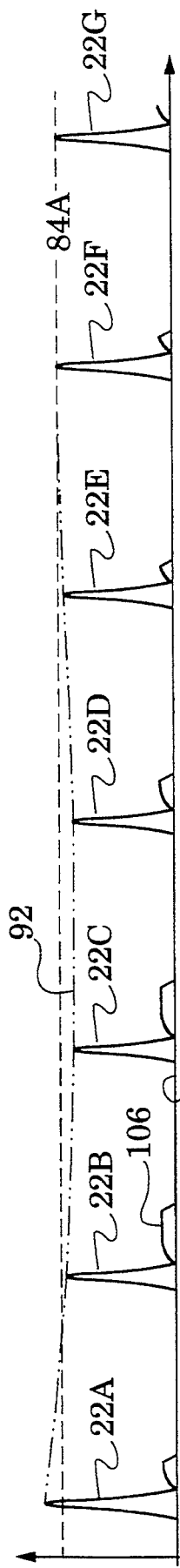
FIG. 4C is a timing diagram showing emitted light pulses of the laser of FIG. 1 corresponding to the population inversion profiles of FIG. 4B.

Attention is now directed to FIG. 1 and the timing diagrams of FIGS. 4A through 4C which illustrate how the feedback loop 30 controls the energy of emitted pulses 22. This loop control makes use of the relationship between output light pulse energy and Q-switch high loss time duration described above with reference to FIGS. 2A, 2B, 3A and 3B. In FIG. 1, a high loss time duration control 80 communicates time duration signals 36 to the Q-switch 34. A variety of signal types may be used for this communication, e.g., digital words, microprocessor means, amplitude modulated pulses, pulse-width modulation. In the following control loop description, an exemplary signal type, pulse-width modulation, will be used. In this embodiment of the invention, the time duration control 80 is a pulse-width modulator.

The time duration control 80 of the system 20 is responsive to three input signals, a trigger input 82, an energy setpoint 84 and the feedback signal 40 applied at its control input 83. In general, each trigger signal at the trigger input 82 results in a laser output pulse 22 while the energy setpoint 84 forms an energy reference level for the control loop 30. In particular, the time duration control 80 produces a pulse 36 in response to the trigger input 82 and varies the width of that pulse in response to the difference between the energy setpoint 84 and the feedback signal 40.

The trigger input 82 and energy setpoint 84 signals can be developed by any of various well known circuits which allow an operator to input a desired pulse rate and energy level. Other preferred embodiments of the invention may be structured to receive these control signals from external sources.

The feedback sense of the loop 30 is arranged so that the Q-switch 34 is in its high loss state when the pulses 36 are present and in its low loss state when they are absent. Loop compensation may be included in the time duration control 80 to set stability and time response in manners well known in the control loop art. It should be understood that the design of pulse-width modulators is also a well known art.

FIG. 4C shows a beginning sequence of output pulses 22 in response to an energy setpoint (reference level) 84A. FIG. 4A illustrates a sequence of pulse-width modulated pulses 36 sent to the Q-switch 34 by the control loop 30 while FIG. 4B illustrates population inversion profiles in the laser 35 resulting from the pulses 36. For illustrative purposes, it is assumed that an initial pulse 22A contains more energy than the reference 84A and that the control loop 30 of FIG. 1 adjusts the energy of the pulses substantially to the reference level 84A along an energy profile 92.

In response to the trigger input 82 of FIG. 1, the time duration control 80 initiates a pulse 36B (in FIG. 4A) and, in response to the difference between the energy setpoint 84 and the feedback signal 40 the time duration control 80 causes the pulse 36B to have a width 94B. The presence of the pulse 36B places the Q-switch in its high loss state and thus, as previously shown in FIG. 2A, the inversion profile 98B increases exponentially towards a saturated level 64.

When the pulse 36B ceases, the Q-switch changes to its low loss state. Consequently, the inversion profile 98B (in FIG. 4B) falls at the trailing edge of pulse 36B as indicated by the vertical line 100. When the inversion profile 98B falls due to laser oscillation, the light pulse 22B is emitted. In the next pulse 36C, the control loop commands a narrower pulse width 94C so that the inversion profile 98C is terminated earlier than profile 98B and the emitted pulse 22C has less energy than the pulse 22B.

Continuing in this manner, the control loop 30 commands pulse widths 94D through 94G. These pulse widths control the time duration of the high loss state of the Q-switch 34 to cause population inversion profiles 98D through 98G and emitted pulses 22D through 22G. The pulse width increases from pulses 98D through 98F. This means the Q-switch high loss time duration increases so that the inversion profiles 98D through 98F build to a higher level which, in turn, results in increasing energy of pulses 22D through 22F. The control loop 30 thus adjusts the output pulse energy to be substantially equal to the energy setpoint 84A. The phantom line 102 in FIG. 4B is set equal to the peak of the inversion profiles 98F, 98G to facilitate comparison of the peaks of the inversion profiles 98.

The energy of pulses 22A through 22G is shown to follow an energy profile 92 as the feedback loop automatically corrects them to substantially equal the energy setpoint 84A. The profile 92 is an aid in illustrating the concept of population inversion control in the feedback loop 30 and its shape is, therefore, exemplary. In various embodiments of the invention, the shape of this profile will depend, in part, on the characteristics of the loop compensation.

When the pulses 94 are present, the Q-switch 34 is in its high loss state so that there is no light emission and the energy at the laser output is at the zero energy level 100 shown in FIG. 4C. When the pulses 94 are absent, the Q-switch 34 is in its low loss state and a low steady state energy level 102 is emitted after each pulse 22 as described above with reference to FIG. 2B. As also explained above, the power in each of the pulses 22 is orders of magnitude greater than the steady state level 102. For many laser applications, this low steady state light emission is of no significance.

In the preferred embodiment of FIG. 1, the sample 44 is derived from a partially reflective mirror 110 disposed across the emitted light output. In another preferred embodiment, the sample is obtained through a partially transparent rear mirror 54 as shown by the broken line 112.

Therefore, FIGS. 4A through 4C illustrate how the feedback control loop 30 of FIG. 1 uses time duration control signal 36 to control population inversion in the laser 35 and stabilize the emitted pulses 22 at a energy setpoint 84. If the energy setpoint 84 is adjusted to a new reference level, the control loop 30 will stabilize the output pulse energy substantially to this new level.

In the embodiment 20 of FIG. 1, the laser 35 is preferably an Nd:YAG (neodymium: yttrium aluminum garnet) laser but the teachings of the invention extend to any laser that is pulsed by means of Q-switching, e.g., solid state, gas, liquid dye. The trigger input 82 was shown, in FIGS. 4A–4C, to generate equally time spaced output pulses 22. This should be understood to be an exemplary arrangement and that, in general, the time spacing of the trigger input 82 may be variable.

From the foregoing it should now be recognized that embodiments of a feedback control laser system have been disclosed herein utilizing population inversion control via high loss time duration control signals applied to a Q-switch to stabilize output pulse energy. Laser systems in accordance with the present invention are simple and economical to fabricate. In addition, they are efficient because they use internal energy control.

The preferred embodiments of the invention described herein are exemplary and numerous modifications and rearrangements can be readily envisioned to achieve an equivalent result, all of which are intended to be embraced within the scope of the appended claims.

What is claimed is:

1. A laser system for controlling the energy of emitted light pulses to substantially equal an energy setpoint, comprising:

a laser including a Q-switch having high loss and low loss states respectively causing output light emission from said laser to be absent and present;

a light detector responsive to said output light emission for producing a feedback signal; and a controller placing said Q-switch in said high loss state for a time duration dependent upon said feedback signal and said energy setpoint.

2. The laser system of claim 1 wherein;

said controller comprises a pulse-width modulator sending pulses having a width sensitive to the difference between said feedback signal and said energy setpoint to said Q-switch; and said Q-switch is in said high loss state when said pulses are present.

3. The laser system of claim 1 further comprising a partially transparent mirror disposed across said output light emission and wherein said light detector is responsive to light reflected from said mirror.

4. The laser system of claim 1 wherein said laser includes a partially transparent rear mirror and said light detector is responsive to light from said rear mirror.

5. A laser system for controlling the energy of emitted light pulses, comprising:

a laser including a Q-switch having high loss and low loss states respectively causing output light emission from said laser to be absent and present;

a light detector responsive to said output light emission for producing a feedback signal;

means for inputting an energy setpoint; and control means for placing said Q-switch in said high loss state for a time duration dependent upon said feedback signal and said energy setpoint.

6. The laser system of claim 5 wherein;

said control means comprises means for communicating pulses having a width sensitive to the difference between said feedback signal and said energy setpoint to said Q-switch; and said Q-switch is in said high loss state when said pulses are present.

7. A method for controlling the energy of emitted light pulses, comprising the steps of:

providing a laser with a Q-switch having high loss and low loss states respectively causing output light emission from said laser to be absent and present;

producing a feedback signal responsive to said output light emission;

establishing an energy setpoint; and placing said Q-switch in said high loss state for a time duration dependent upon said feedback signal and said energy setpoint.

8. The method of claim 7 wherein said placing step includes the step of communicating pulses having a width sensitive to the difference between said feedback signal and said energy setpoint to said Q-switch and said providing step includes the step of configuring said Q-switch to be in said high loss state when said pulses are present.

* * * * *